US008225714B2

(12) United States Patent
Wursch et al.

(10) Patent No.: US 8,225,714 B2
(45) Date of Patent: Jul. 24, 2012

(54) MOUNTING OF NUMBERING DEVICES ONTO NUMBERING CYLINDERS

(75) Inventors: Alain Wursch, La Tour-de-Peilz (CH); Antoine Merminod, Gimel (CH)

(73) Assignee: KBA-Giori S.A., Lausanne (CH)

( * ) Notice: Subject to any disclaimer, the term of this patent is extended or adjusted under 35 U.S.C. 154(b) by 571 days.

(21) Appl. No.: 12/310,108

(22) PCT Filed: Aug. 8, 2007

(86) PCT No.: PCT/IB2007/053146
§ 371 (c)(1), (2), (4) Date: Feb. 11, 2009

(87) PCT Pub. No.: WO2008/020370
PCT Pub. Date: Feb. 21, 2008

(65) Prior Publication Data

US 2010/0000427 A1 Jan. 7, 2010

(30) Foreign Application Priority Data

Aug. 16, 2006 (EP) .................................... 06118981
Nov. 23, 2006 (EP) .................................... 06124668

(51) Int. Cl.

| | |
|---|---|
| ***B41K 3/12*** | (2006.01) |
| ***B41K 3/10*** | (2006.01) |
| ***B41K 1/10*** | (2006.01) |
| ***B41F 1/10*** | (2006.01) |
| ***F16M 1/00*** | (2006.01) |

(52) U.S. Cl. ................ 101/76; 101/77; 101/84; 101/85; 101/86; 101/87; 248/674

(58) Field of Classification Search .................... 101/76, 101/77, 84–87, 216, 382.1, 383, 479, 480; 248/674, 676, 677; 269/3, 6, 70, 74, 83, 269/91, 95, 902
See application file for complete search history.

(56) References Cited

U.S. PATENT DOCUMENTS 3,377,948 A 4/1968 Giori
3,728,960 A 4/1973 Heath
4,677,910 A 7/1987 Kuhfuss
(Continued)

FOREIGN PATENT DOCUMENTS

DE 1486894 7/1969
(Continued)

*Primary Examiner* — Judy Nguyen
*Assistant Examiner* — Justin Olamit
(74) *Attorney, Agent, or Firm* — Clifford W. Browning; Krieg DeVault LLP

(57) ABSTRACT

There is described a numbering system for carrying out numbering in a printing press comprising a numbering cylinder, a rotatable shaft defining a rotation axis, at least one supporting disc mounted on the rotatable shaft for rotation therewith, the supporting disc comprising a peripheral mounting ring for mounting of at least one numbering device (1.06; 2.06) on a periphery of the supporting disc, which numbering device (1.06; 2.06) is secured to the peripheral mounting ring (1.43) by means of a clamping mechanism. The peripheral mounting ring (1.43) has a T-shaped cross-section defining a pair of annular mounting grooves (1.43*a*, 1.43*b*) on each side of the peripheral mounting ring (1.43). The numbering device (1.06; 2.06) comprises clamping elements (1.50; 2.50) on each side of the numbering device (1.06; 2.06) which are adapted to cooperate with the annular mounting grooves (1.43*a*, 1.43*b*) for securing the numbering device (1.06; 2.06) onto the peripheral mounting ring (1.43). The clamping elements (1.50; 2.50) are preferably spring-loaded clamping elements.

26 Claims, 9 Drawing Sheets

U.S. PATENT DOCUMENTS

| | | | | |
|---|---|---|---|---|
| 4,843,959 | A | 7/1989 | Rendell | |
| 5,660,106 | A | 8/1997 | Pitz et al. | |
| 6,601,524 | B2 * | 8/2003 | Janata et al. | 108/143 |
| 7,216,583 | B2 | 5/2007 | Schaede | |
| 2009/0235832 | A1 | 9/2009 | Würsch et al. | |

FOREIGN PATENT DOCUMENTS

| | | | |
|---|---|---|---|
| DE | 3047390 | A1 | 7/1982 |
| EP | 0 061 795 | A1 | 10/1982 |
| EP | 0 718 112 | A1 | 9/1995 |
| EP | 1 731 324 | A1 | 6/2005 |
| EP | 06115994.3 | | 12/2007 |
| GB | 1 166 629 | | 10/1969 |
| WO | WO 2004/016433 | A1 | 2/2004 |
| WO | WO 2005/018945 | A1 | 3/2005 |
| WO | WO 2006/131839 | A2 | 12/2006 |
| WO | WO 2007/148288 | A2 | 12/2007 |

* cited by examiner

MOUNTING OF NUMBERING DEVICES ONTO NUMBERING CYLINDERS

"This application claims the benefits under 35 U.S.C. 119 (a)-(d) or (b), or 365(b) of International Application No. PCT/IB2007/053146 filed Aug. 8, 2007, and European Patent Application No. 0611898.7 filed Aug. 16, 2006" and European Patent Application No. 06124668.2 filed Nov. 23, 2006.

TECHNICAL FIELD

The present invention generally relates to the mounting of numbering devices onto numbering cylinders as used in particular for carrying out numbering of printed documents, especially banknotes or the like securities.

BACKGROUND OF THE INVENTION

Numbering presses for carrying out numbering of printed documents are already known in the art. Such a numbering press is for instance disclosed in German patent application No. DE 1 486 894 or European patent application No. EP 0 061 795. FIG. 1 is a drawing taken from European patent application No. EP 0 061 795 which schematically illustrates a numbering press.

As illustrated in FIG. 1, such numbering press typically comprises a printing unit 1 equipped with an impression cylinder 2 and a numbering unit 3 cooperating with the impression cylinder 2. A continuous web or individual sheets to be printed is/are fed to the impression cylinder 2 using known transfer means (not illustrated in FIG. 1). Once printed, the web or sheets is/are fed to a delivery unit (not illustrated in FIG. 1).

The numbering unit 3 typically comprises at least one numbering cylinder 4 which is inked by a known inking system 5. In the field of numbering of banknotes, it is common to have at least two such numbering units 3 cooperating with the same impression cylinder 2 so as to print two serial numbers on each banknote.

In the field of printing of banknotes, a plurality of banknote prints are printed on successive sheets or web portions in the form of arrays having a determined number of columns and rows. These sheets or web portions are ultimately cut into individual banknotes at the end of the printing process. When carrying out numbering of such sheets or web portions, the numbering press has to be equipped with a numbering cylinder comprising as many numbering devices as there are positions to be numbered on each sheet or web portion.

FIG. 2 is a partial cross-section view of a typical numbering cylinder 4 used for numbering several positions on a sheet or web portion, which partial cross-section view is taken along the axis of rotation of the numbering cylinder 4. The numbering cylinder 4 commonly comprises a shaft 41 bearing a plurality of supporting discs 42 (only one being shown in FIG. 2). Each supporting disc 42 carries a plurality of numbering devices (or numbering boxes) 6 which are distributed around the periphery of the supporting disc 42 (only one numbering device 6 being shown in FIG. 2). Each numbering device 6 typically comprises a housing 60 with a plurality of rotatable numbering wheels 61 disposed one next to the other around a common shaft. It will be appreciated that the numbering cylinder 4 comprises as many supporting discs 42 as there are columns of prints to be numbered on the sheets or web portions and that each supporting disc 42 comprises as many numbering devices 6 as there are rows of prints to be numbered on the sheets or web portions.

When using mechanically-actuated numbering devices, mechanical actuation means are additionally provided in order to adequately actuate the numbering wheels 61 of each numbering device 6. To this end, mechanically-actuated numbering devices 6 usually comprise a switch lever 66 for actuating the numbering wheels 61, which switch lever 66 cooperates with a switch cam disc 71 via a switch cam follower 67 (there being as many switch cam discs 71 as there are supporting discs 42). Each switch cam disc 71 is fixed with respect to the rotation of the numbering cylinder 4 and carries a cam surface (not shown) designed to initiate actuation of the numbering devices 6 between each numbering iteration. More detailed explanation about such actuation means might be found for instance in U.S. Pat. No. 3,377,948 or European patent application EP 0 718 112.

In instances where mechanically-autonomous electronic numbering devices are used, such mechanical actuation means might not at all be necessary. This is for instance the case of the numbering device disclosed in European patent application No. 06115994.3 filed on Jun. 23, 2006 in the name of the present Applicant and entitled "NUMBERING DEVICE FOR TYPOGRAPHIC NUMBERING".

Further numbering devices are also disclosed in U.S. Pat. No. 4,677,910, International application No. WO 2004/016433, German patent application No. DE 30 47 390, U.S. Pat. No. 4,843,959, International application No. WO 2005/018945, as well as European patent application No. 05405375.6 filed on Jun. 8, 2005, which is now European Patent No. 1 731 324 A1, in the name of the present Applicant and entitled "NUMBERING PROCESS FOR SECURITIES, METHOD FOR PROCESSING THE NUMBERED SECURITIES AND NUMBERING DEVICE TO CARRY OUT THE NUMBERING PROCESS".

As shown in FIG. 2, each numbering device 6 is mounted on a peripheral mounting ring 43 provided on the periphery of the supporting disc 42. This peripheral mounting ring 43 typically exhibits a dovetailed cross-section, as shown in FIG. 2. Each numbering device 6 comprises a corresponding dovetailed mounting groove 63 conforming to the shape of the peripheral mounting ring 43, as well as a clamping mechanism 65 for clamping the numbering device 6 in position onto the peripheral mounting ring 43. This clamping mechanism 65 typically includes a clamping part that is moveable with respect to the housing of the numbering device 6 and that can be displaced laterally (usually by means of screws, not illustrated in FIG. 2) towards one side of the peripheral mounting ring 43 so as to shorten the gap of the mounting groove 63 and thereby secure the numbering device 6 onto the peripheral mounting ring 43.

A problem with the dovetail mounting discussed above resides in the fact that there remains a substantial risk that the numbering devices loosen from the peripheral mounting ring 43 and get detached from the supporting discs 42, thereby causing considerable damage not only to the numbering devices themselves but also to the printing press in which they are mounted.

Adjustment of the position of the numbering devices about the peripheral mounting ring is furthermore rather difficult as it implies unscrewing and screwing of the clamping part of the clamping mechanism.

In addition, the dovetail mounting requires that the mounting ring 43 and mounting groove 63 match together, i.e. exhibit a similar curvature following that of the supporting discs 42 on which the numbering devices 6 are mounted. This means that each numbering device has to be designed in correspondence with the diameter of the numbering cylinder on which they are meant to be mounted and that a numbering device designed for a given numbering cylinder diameter will not fit on a numbering cylinder having a different diameter.

There is therefore a need for an improved solution for mounting numbering devices onto numbering cylinders of printing presses.

SUMMARY OF THE INVENTION

An aim of the invention is to improve the known devices.

In particular, an aim of the present invention is to provide an improved mounting system which facilitates mounting of numbering devices onto numbering cylinders.

Another aim of the present invention is to provide such an improved mounting system which reduces risks that numbering devices loosen from their support and get detached from the numbering cylinder during operation.

Still another aim of the present invention is to provide such an improved mounting system which remains simple to implement.

These aims are achieved thanks to the device defined in the claims.

There is accordingly provided a numbering system for carrying out numbering in a printing press with a numbering cylinder comprising a rotatable shaft defining a rotation axis, at least one supporting disc mounted on the rotatable shaft for rotation therewith, the supporting disc comprising a peripheral mounting ring for mounting of at least one numbering device on a periphery of the supporting disc, which numbering device is secured to the peripheral mounting ring by means of a clamping mechanism. According to the invention, the peripheral mounting ring has a T-shaped cross-section defining a pair of annular mounting grooves on each side of the peripheral mounting ring. The numbering device, on the other hand, comprises clamping elements on each side of the numbering device, which clamping elements are adapted to cooperate with the annular mounting grooves for securing the numbering device onto the peripheral mounting ring. Preferably, the clamping elements are spring-loaded clamping elements.

According to an advantageous embodiment of the invention, the numbering device comprises a pair of mounting leg portions extending on each side of the peripheral mounting ring, the clamping elements being mounted on the mounting leg portions for cooperation with the annular mounting grooves.

According to another embodiment of the invention, the numbering device comprises a V-shaped mounting section with two planar mounting surfaces cooperating with the periphery of the peripheral mounting ring such that the V-shaped mounting section contacts the periphery of the peripheral mounting ring along two contact lines. This V-shaped mounting section on the numbering device permits mounting of the device on numbering cylinders of various diameters. Such V-shaped mounting section is furthermore cheaper to machine during manufacture.

According to one embodiment of the invention, each clamping element comprises a clamping leg having a foot engaging into a corresponding one of the annular mounting grooves and the clamping elements are designed in such a way that the numbering device can be released from the peripheral mounting ring by pressing the clamping elements towards the supporting disc and rotating these by 180° so that the clamping legs disengage from the corresponding annular mounting grooves. This greatly facilitates the mounting and dismounting of the numbering devices onto or from the numbering cylinder.

Still according to another embodiment of the invention, the clamping elements are designed in such a way that the numbering device can be moved along the peripheral mounting ring by pressing the clamping elements towards the supporting disc in order to release the pressure exerted by the clamping elements against the annular mounting grooves. This greatly facilitates the adjustment of the position of the numbering devices along the peripheral mounting ring.

In a preferred embodiment of the invention, each clamping element comprises a pivotable clamping lever having a hook portion engaging into a corresponding one of the annular mounting grooves.

The clamping elements may be spring-loaded clamping elements and the spring may be disposed between a side of the numbering device and the clamping lever in order to push the hook portion of the clamping lever into the corresponding annular mounting groove.

Preferably, each clamping lever is dimensioned such that it can be released by hand by applying a force on an upper extremity of the lever.

In the preferred embodiment, an inner surface of the peripheral mounting ring is conical and exhibits a positive angle $\theta$ with respect to the axis of rotation of said numbering cylinder. The angle $\theta$ is selected to correspond substantially to the arctangent $\gamma$ of a coefficient of friction cf between the hook portion of the clamping lever and the inner surface of the peripheral mounting ring.

In this embodiment, a line a1 intersecting an axis of rotation of said clamping lever and a contact point C between the hook portion of the clamping lever and the inner surface of the peripheral mounting ring forms an angle $\alpha$ with respect to a vertical line a2 perpendicular to the axis of rotation of the numbering cylinder.

In addition, in this embodiment, each clamping element is mounted onto a bearing provided on a part of the numbering device by means of a shaft, which shaft is fixedly secured to the clamping lever by means of a securing element.

Further advantageous embodiments of the invention are the subject-matter of the dependent claims.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

Figure 1:
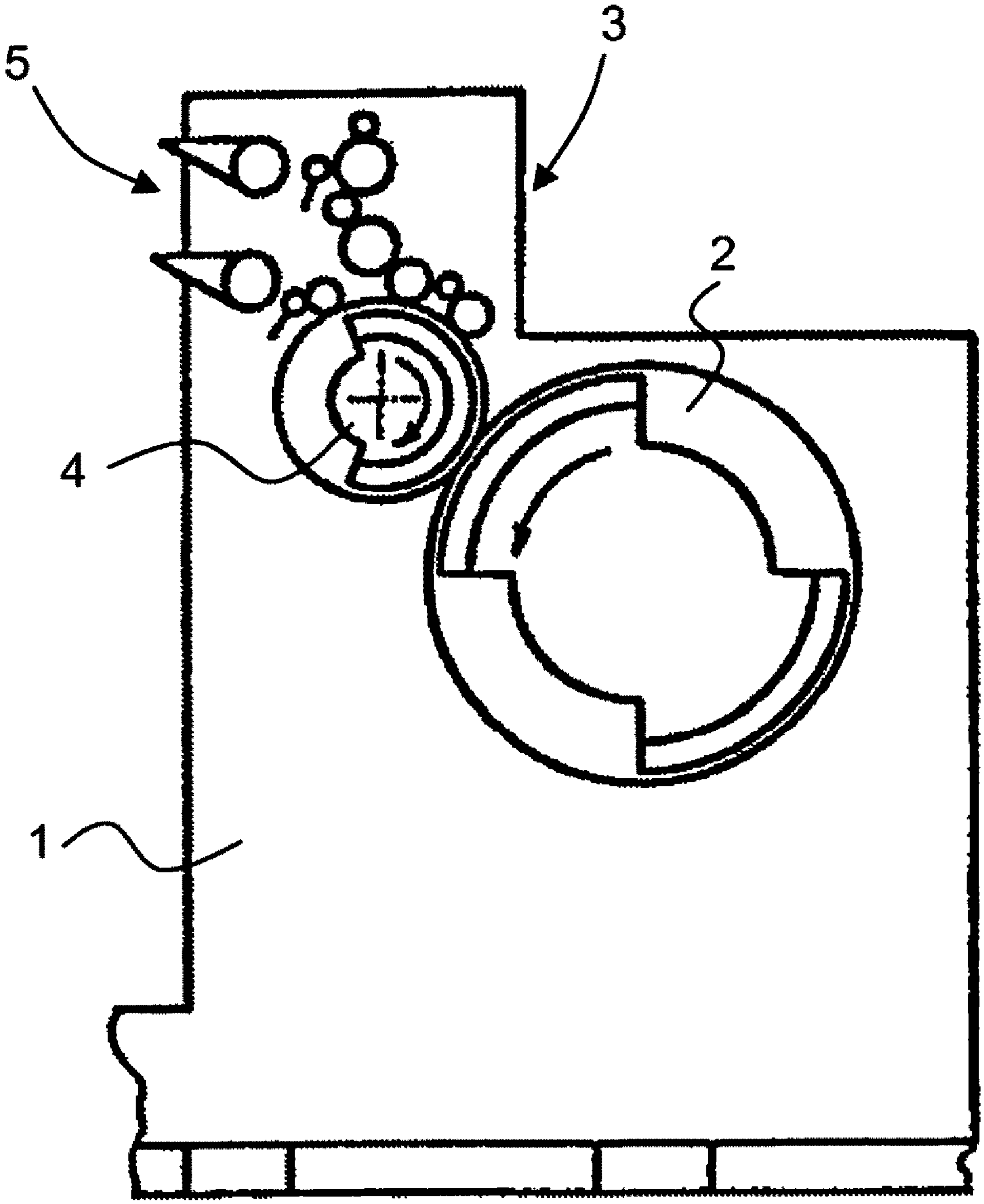
Fig. 1 (PRIOR ART)
FIG. 1 is a schematic side view of a prior art printing press comprising a numbering cylinder.
Figure 2:
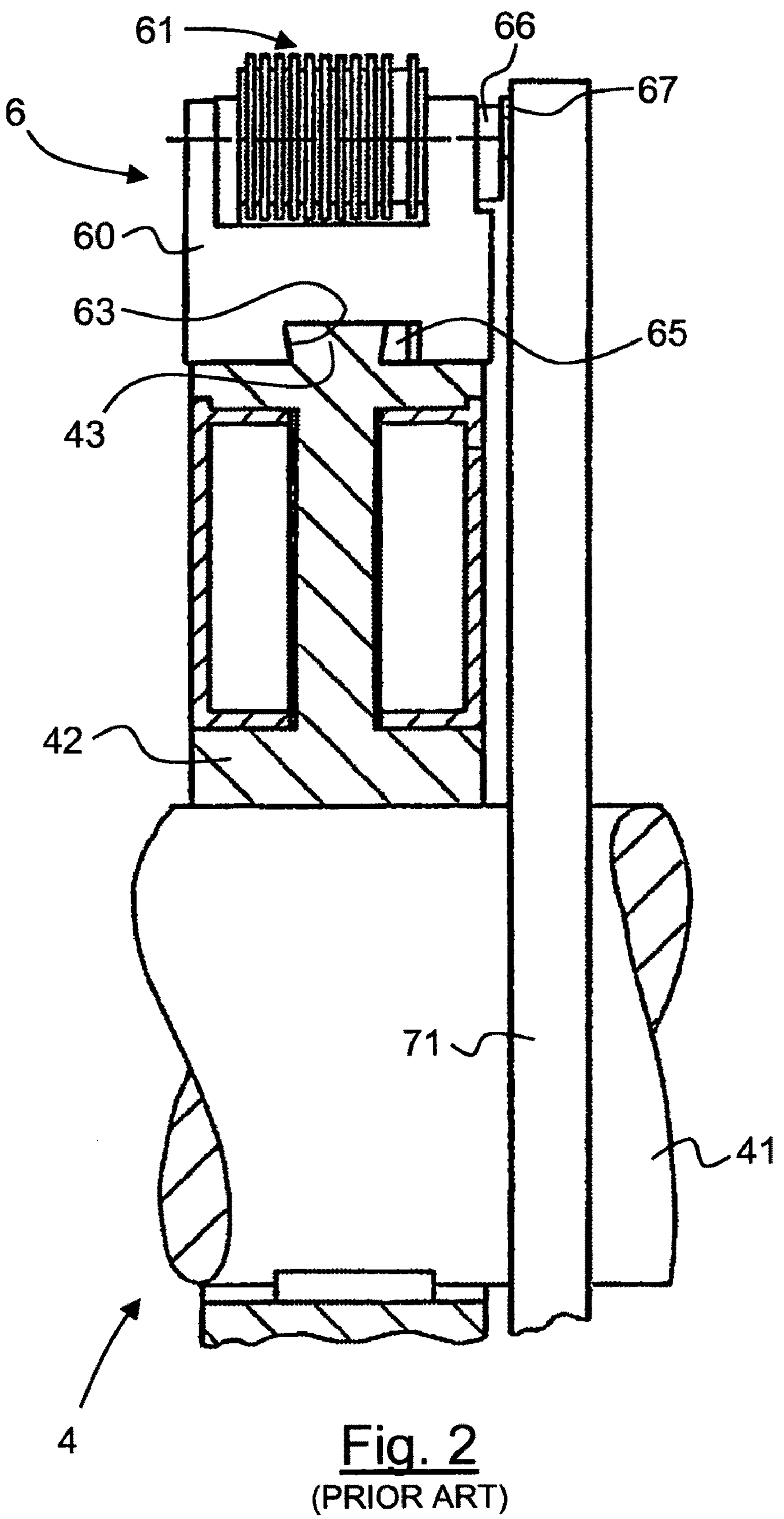
Fig. 2 (PRIOR ART)
FIG. 2 is a schematic partial cross-section view of the prior art numbering cylinder commonly used in the printing press of FIG. 1.
Figure 3:
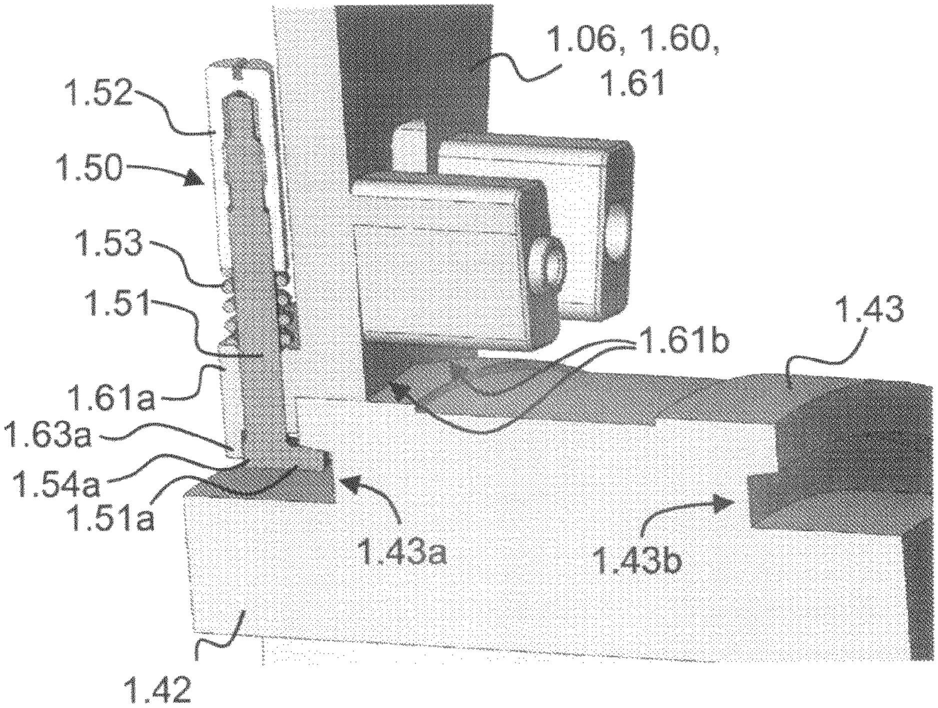
FIG. 3 is a partial perspective view showing a mounting system for mounting of a numbering device onto the supporting disc of a numbering cylinder according to one embodiment of the invention.

FIG. 3 is a partial perspective view showing the mounting of a numbering device, designated globally by reference 1.06, onto the supporting disc 1.42 of a numbering cylinder according to one embodiment of the invention. The remainder of the numbering cylinder is not shown in FIG. 3. One will however understand that, except for the mounting system for the numbering device 1.06, the configuration of the numbering cylinder remains similar to that illustrated in FIG. 2, i.e. it comprises a rotatable shaft defining a rotation axis onto which shaft the supporting disc 1.42 is mounted for rotation therewith, it being further understood that additional supporting discs are distributed along the rotation axis of the numbering cylinder in a number equal to the number of columns of prints on the sheets or web portions to be numbered.

Only part of the numbering device 1.06 is shown in FIG. 3, namely the lower portion of one side frame part 1.61 of the housing 1.60 of the numbering device 1.06. In this example, the housing 1.60 of the numbering device 1.06 comprises two side frame parts 1.61, 1.62, located opposite one another and secured to each other (for instance by screws not illustrated). Side frame part 1.62 has been omitted in FIG. 3 for the purpose of explanation but is shown in the cross-section view of FIG. 4.

One will not describe the configuration of the numbering device 1.06 per se and of its functioning any further as it is not of particular relevance within the scope of the present invention. It suffice to understand that the numbering device 1.06 comprises, located at its upper portion, a set of rotatable numbering wheels as schematically illustrated in FIG. 2. This numbering device 1.06 can be any type of numbering device, such as a mechanically-actuated numbering device requiring mechanical actuation means (as discussed in reference to FIG. 2) or a mechanically-autonomous electronic numbering device requiring no such mechanical actuation means, as disclosed in European patent application No. 06115994.3 filed on Jun. 23, 2006 in the name of the present Applicant and entitled "NUMBERING DEVICE FOR TYPOGRAPHIC NUMBERING".

Still referring to FIG. 3, one will appreciate that the supporting disc 1.42 comprises a peripheral mounting ring 1.43 for mounting of numbering devices. In contrast to the prior art solutions which make use of a peripheral mounting ring having a dovetailed cross-section, the peripheral mounting ring 1.43 has a T-shaped cross-section defining a pair of annular mounting grooves 1.43*a*, 1.43*b* on each side of the peripheral mounting ring. These annular mounting grooves 1.43*a*, 1.43*b* form a continuous anchoring means for mounting of the numbering devices as this will be explained hereinafter.

The underside of each numbering device 1.06 is supported on the peripheral mounting ring 1.43 and is secured thereto by means of clamping elements 1.50 adapted to cooperate with the annular mounting grooves 1.43*a*, 1.43*b*. The clamping elements 1.50 are advantageously spring-loaded clamping elements so as to facilitate mounting and adjustment operations. Preferably, as illustrated, the housing 1.60 of the numbering device 1.06 is provided with a pair of mounting leg portions 1.61*a*, 1.62*a* (FIG. 3 showing only mounting leg portion 1.61*a*; the two being however visible in FIG. 4) extending on each side of the peripheral mounting ring 1.43, thereby providing a stable support and guidance of the numbering device 1.06 on the peripheral mounting ring 1.43. The clamping elements 1.50 are mounted on these mounting leg portions 1.61*a*, 1.62*a* for cooperation with the annular mounting grooves 1.43*a*, 1.43*b*.

Figure 4:
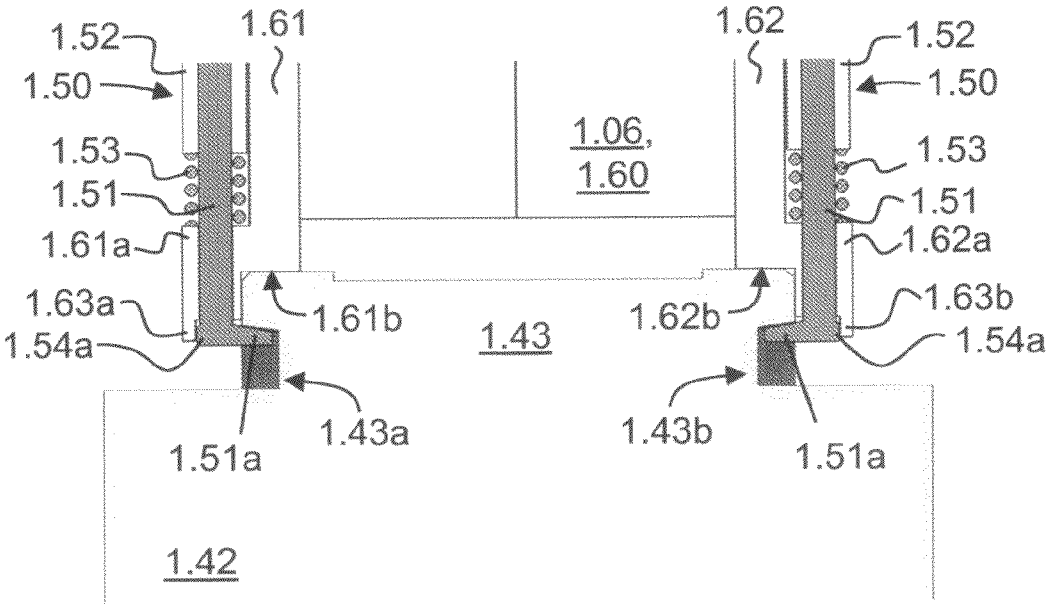
FIG. 4 is a partial cross-section view of the mounting of FIG. 3 taken perpendicularly to the section of the supporting disc, along the axis of rotation of the numbering cylinder.
Figure 5:
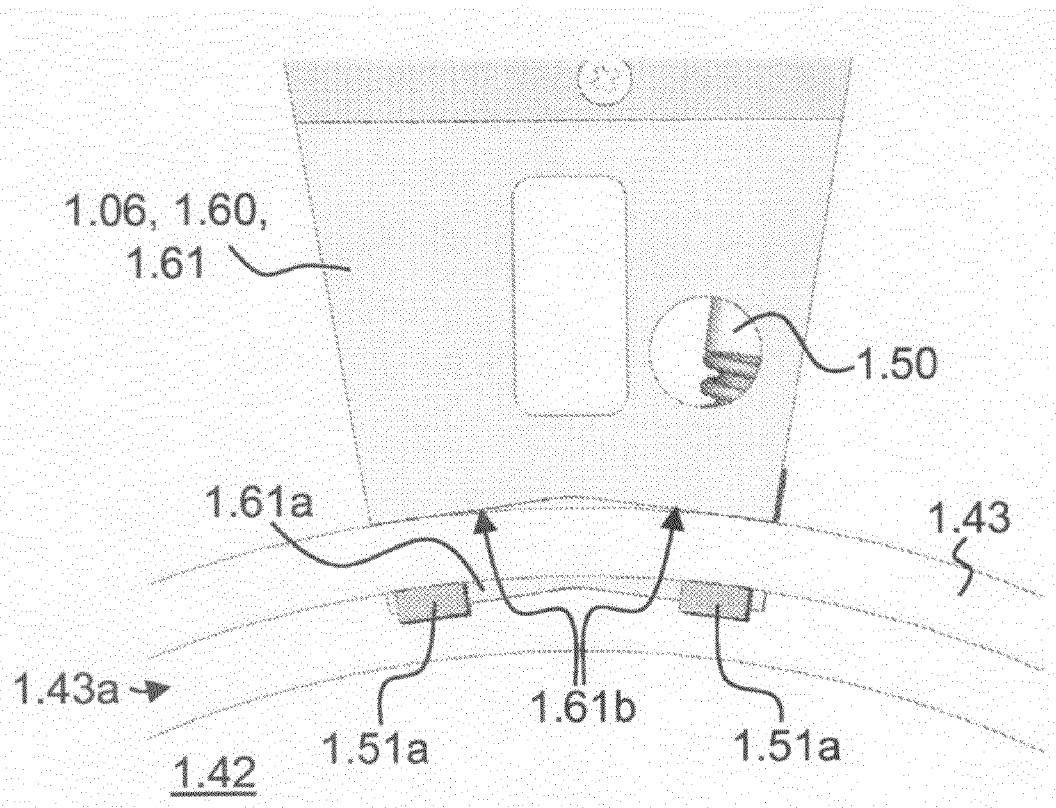
FIG. 5 is a partial cross-section view of the mounting of FIGS. 3 and 4 taken perpendicularly to the axis of rotation of the numbering cylinder.
Figure 6:
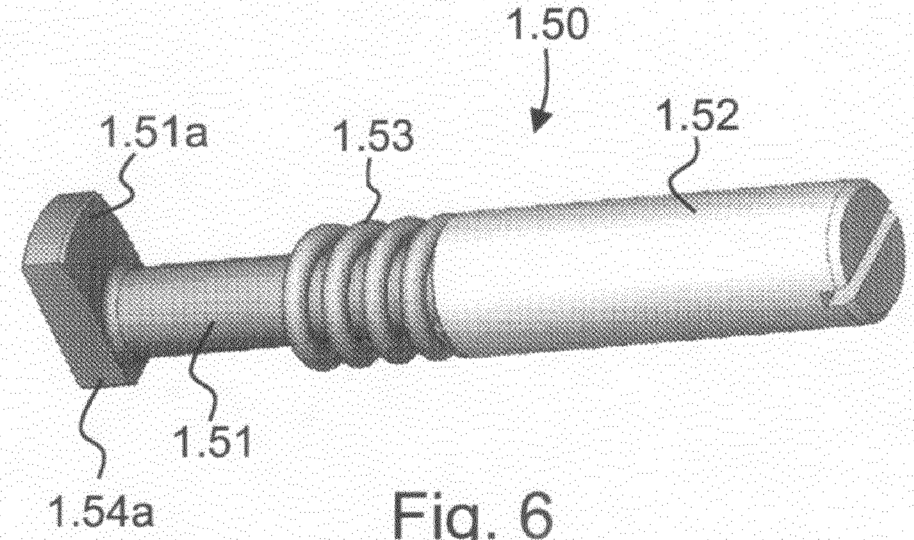
FIG. 6 is a perspective view of a clamping element used in the mounting of FIGS. 3 to 5.

A more detailed view of the clamping element 1.50 is provided in FIG. 6. According to this preferred embodiment, the clamping element 1.50 comprises a clamping leg 1.51 having a foot 1.51*a* engaging into a corresponding one of the annular mounting grooves 1.43*a*, 1.43*b* (see FIGS. 3 to 5) and a heel 1.54*a* engaging against a wall 1.63*a*, 1.63*b* of the leg portions 1.61*a*, 1.62*a* respectively (as represented in FIGS. 3 and 4). Still according to this preferred embodiment, each clamping element 1.50 further comprises a head part 1.52 secured (for instance through a threaded portion) to the clamping leg 1.51 at an end thereof opposite the foot 1.51*a* and a spring 1.53 disposed around the clamping leg 1.51. When the clamping element 1.50 is mounted on the numbering device 1.06, as illustrated in FIGS. 3 and 4, the spring 1.53 is compressed between the head part 1.52 and the part of the numbering device 1.06 on which the clamping element 1.50 is mounted, i.e. an upper portion of the mounting leg portions 1.61*a*, 1.62*a*.

In the illustrated example, the head part 1.52 can be screwed or unscrewed from the clamping leg 1.51 so as to adjust the contact force (or pressure) of each clamping element. More precisely, the head part 1.52 can be fully screwed onto the clamping leg 1.51, as illustrated, so as to compress the spring 1.53 up to a highly-compressed state where this compressed spring 1.53 produces a sufficient force for securing the numbering device 1.06 firmly in place onto the peripheral mounting ring 1.43. In another state, the head part 1.52 can be slightly unscrewed from the clamping leg 1.51 so as to bring the spring 1.53 to a lightly-compressed state and thereby release the pressure exerted by the spring 1.53 with a view to facilitate mounting and adjustment of the numbering device 1.06 along the circumference supporting disc 1.42.

In a variant, the use of a spring may be avoided and the head part 1.52 could be made long enough to contact the surface of leg portions 1.61*a* (and also 1.62*a*) and apply pressure directly against this surface when being screwed hence securing the numbering device 1.06 onto the peripheral mounting ring 1.43.

In alternate embodiments of the clamping elements 1.50, one could envisage other means for adjusting the compression state of the spring 1.53. In particular, a cam mechanism with an eccentric cam could be used to switch the state of each clamping element, as before, between a highly-compressed state where the spring 1.53 is compressed up to a stage where the numbering device 1.06 is firmly secured to the peripheral mounting ring 1.43 and a lightly-compressed state where the spring 1.53 is compressed up to a stage sufficient for holding the numbering device 1.06 in place on the peripheral mounting ring 1.43 while still enabling positional adjustment of the numbering device 1.06 along the circumference of the supporting disc 1.42.

In a variant of this alternate embodiment, the use of springs may again be avoided and the cam mechanism could be designed so as to contact the surface of leg portions 1.61*a* (respectively 1.62*a*) and apply pressure directly against this surface hence securing the numbering device 1.06 onto the peripheral mounting ring 1.43.

In the preferred embodiment, each numbering device 1.06 comprises two clamping elements 1.50 for cooperation with each annular mounting groove 1.43*a*, 1.43*b*, i.e. a total of four clamping elements 1.50, two clamping elements 1.50 per side frame part 1.61, 1.62 as illustrated in FIG. 5. This Figure only shows the arrangement of two clamping elements 1.50 on side frame part 1.61 for cooperation with annular mounting groove 1.43*a*, it being understood that the arrangement of the other two clamping elements 1.50 on side frame part 1.62 is identical.

In the preferred embodiment making use of spring-loaded camping elements, the numbering device 1.06 can be released from the peripheral mounting ring 1.43 by pressing the clamping elements 1.50 towards the supporting disc 1.42 and rotating these by 180° once the heel 1.54*a* is not engaged anymore against the walls 1.63*a* and 1.63*b* so that the feet 1.51*a* may disengage from the corresponding annular mounting grooves 1.43*a*, 1.43*b*. More precisely, by pressing a clamping element 1.50 towards the supporting disc 1.42, the spring 1.53 is compressed and the clamping leg 1.51 is lowered with respect to the corresponding mounting leg portion 1.61*a* or 1.62*a* thus disengaging the heel 1.54*a* from the walls 1.63*a* and 1.63*b*. Then, by rotating the clamping element 1.50 by 180° once the disengagement of the heel 1.54*a* is realized, the foot 1.51*a* of the clamping leg 1.51 is allowed to pass below the corresponding mounting leg portion 1.61*a* or 1.62*a* and disengage from the annular mounting groove 1.43*a* or 1.43*b*. Mounting of a numbering device 1.06 onto the peripheral mounting ring 1.43 is performed in a reversed manner.

In the above example, one will appreciate that each clamping element 1.50 is not allowed to rotate from its mounting position (illustrated in FIGS. 3 to 5), unless such clamping element 1.50 is pressed towards the periphery of the supporting disc 1.42. In other words, in the mounting position, each wall 1.63*a* and 1.63*b* of the mounting leg portion 1.61*a*, 1.62*a* prevents the clamping leg 1.51 of the clamping element 1.50 from rotating by engagement with the heel 1.54*a*, thereby ensuring that the numbering device 1.06 sits firmly in place.

In addition, in the preferred embodiment making use of spring-loaded clamping elements, one will appreciate that the numbering device 1.06 can be moved along the peripheral mounting ring 1.43 by pressing the clamping elements 1.50 towards the supporting disc 1.42 in order to release the pressure exerted by the clamping elements 1.50 against the annular mounting grooves 1.43*a*, 1.43*b*.

One will understand that the spring-loaded clamping elements 1.50 have to be designed in such a way as to ensure a stable mounting of the numbering device 1.06 and prevent disengagement of the numbering device 1.06 from the peripheral mounting ring 1.43 during operation. To this end, in addition to the mechanism explained hereinabove, the force of the spring elements 1.53 is selected so that the combined force exerted by the clamping elements 1.50 is sufficient to counteract the centrifugal and tangential forces exerted on the numbering device 1.06 during operation. In a preferred variant, each clamping element 1.50 is designed so as to produce, in its highly-compressed state, a force of the order of 120 N, thereby yielding a total force of 480 N holding each numbering device 1.06 against the peripheral mounting ring 1.43. As already mentioned, by providing an adjustable head part 1.52 on each clamping element 1.50, the pressure exerted by the spring element 1.53 can be reduced so as to ease mounting and adjustment operations.

According to another advantageous aspect of the preferred embodiment, one can see in FIGS. 3 and 5 that the numbering device 1.06 comprises a V-shaped mounting section 1.61*b*, 1.62*b* with two planar mounting surfaces cooperating with the periphery of the peripheral mounting ring 1.43. This means that the V-shaped mounting section 1.61*b*, 1.62*b* contacts the periphery of the peripheral mounting ring 1.43 along two contact lines. This particular configuration is advantageous in that the numbering device 1.06 can be mounted on supporting discs 1.42 of varying diameters, this being not possible with the prior art solutions using dovetail mountings.

Figure 7:
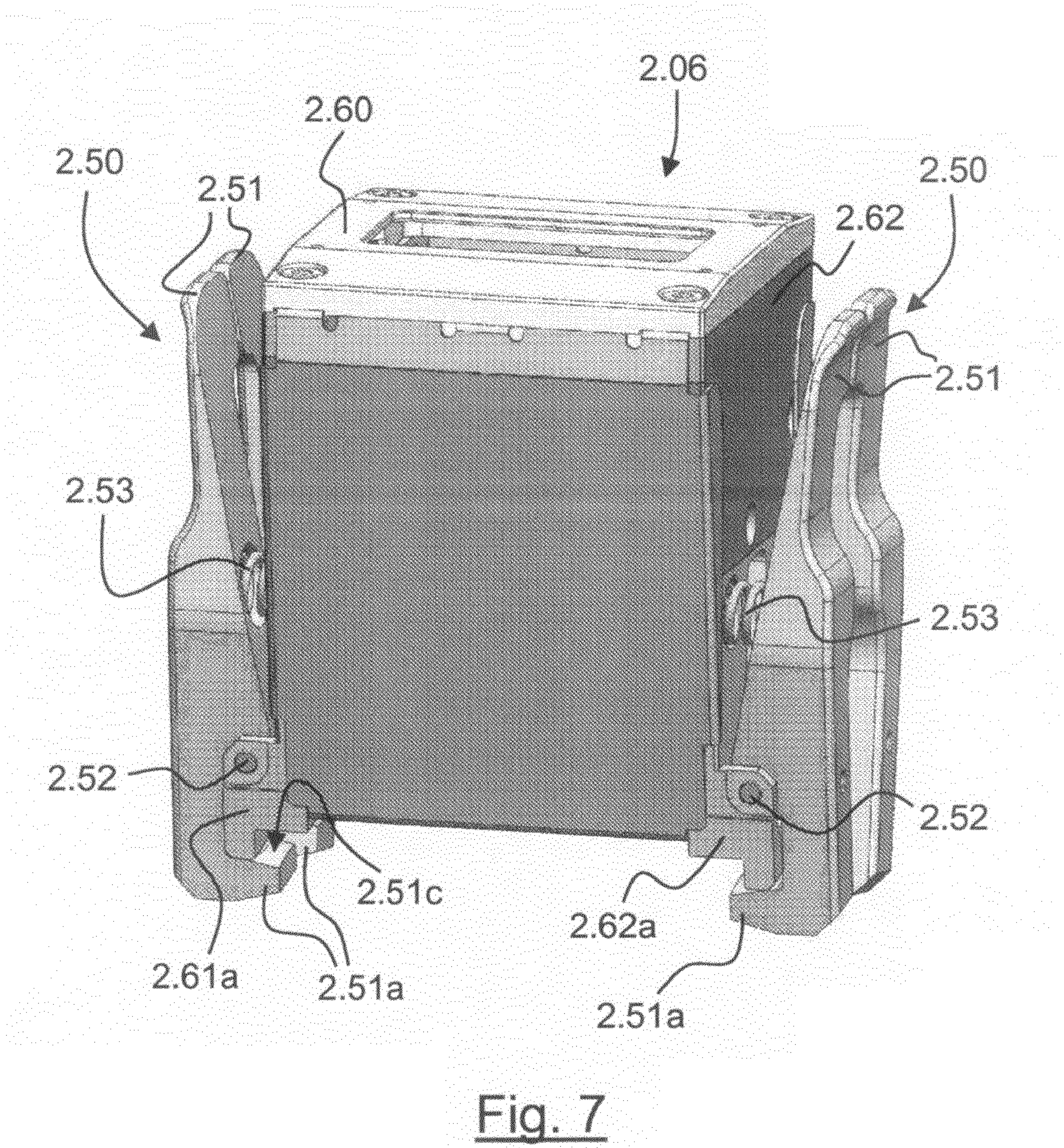
FIG. 7 is a perspective view showing a numbering device equipped with a mounting system according to another embodiment of the invention.
Figure 8:
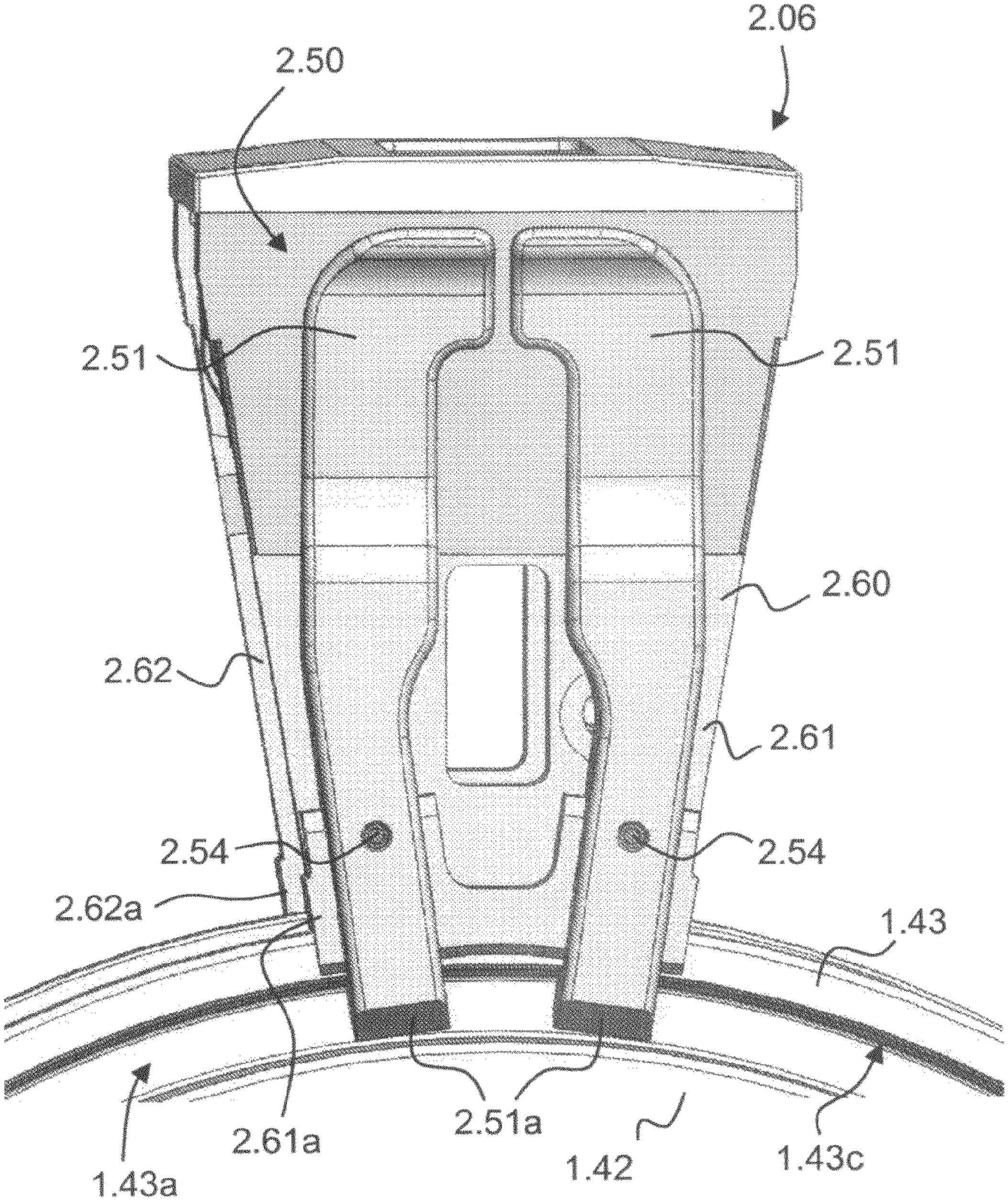
FIG. 8 is a side view in perspective of the numbering device of FIG. 7 mounted on a corresponding supporting disc of a numbering cylinder.
Figure 9:
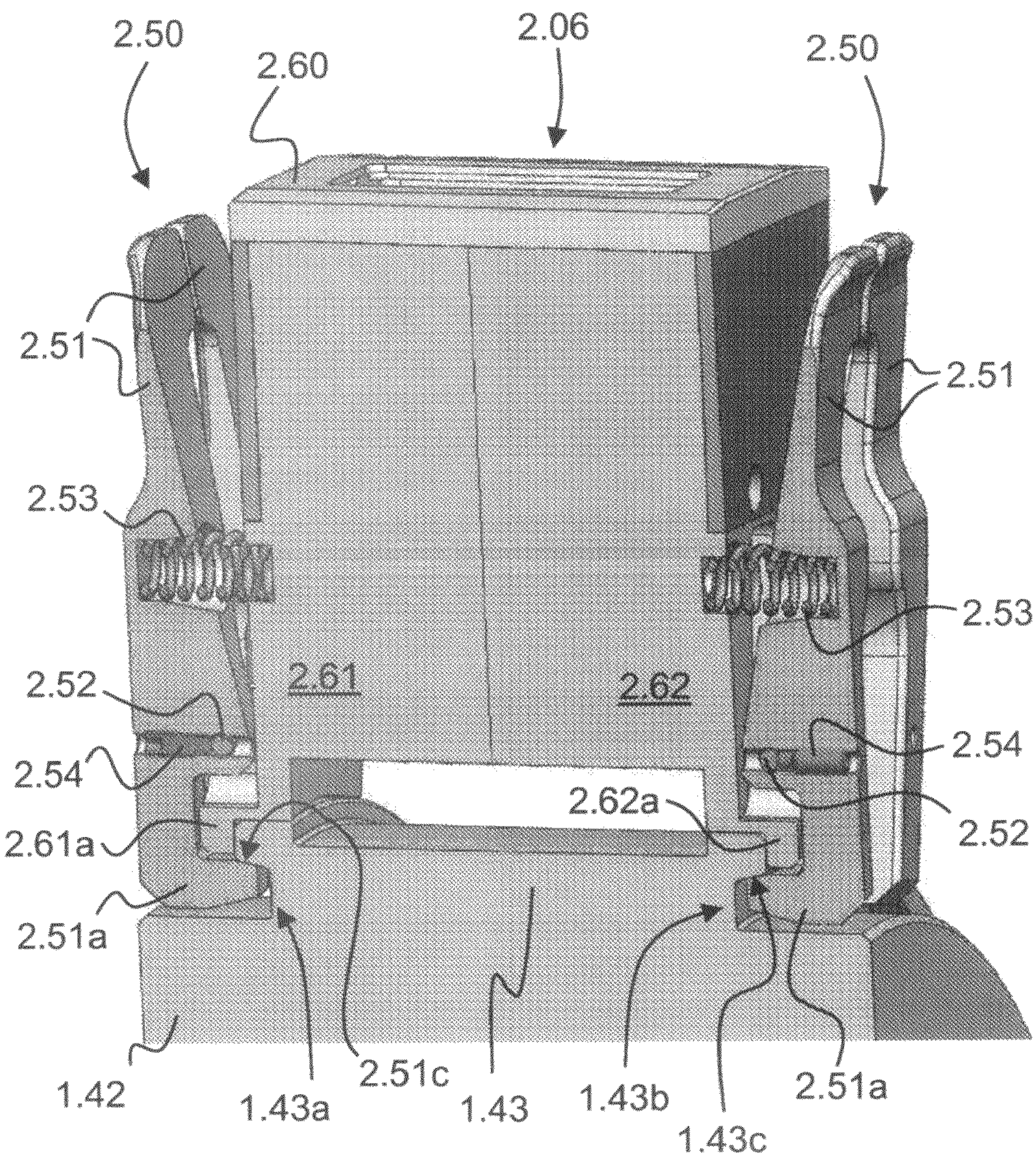
FIG. 9 is a cross-sectional perspective view showing the numbering device of FIG. 7 mounted on its supporting disc.

FIGS. 7 to 10, 11*a* and 11*b* illustrate another embodiment of the invention for securing a numbering device, designated in this other example by reference numeral 2.06, onto the peripheral mounting ring 1.43 of the supporting disc 1.42. As before, only relevant parts of the numbering device 2.06 are shown in FIGS. 7 to 9, namely a housing 2.60 thereof comprising two side frame parts 2.61 and 2.62 secured to each other (for instance by screws not illustrated). The actual configuration of the numbering device 2.06 per se and its functioning will not be described as these are not of particular relevance within the scope of the present invention. It suffice to understand that the numbering device 2.06 comprises, located at its upper portion, a set of rotatable numbering wheels (not illustrated in FIGS. 7 to 9) as schematically illustrated in FIG. 2. This numbering device 2.06 can again be any type of numbering device, such as a mechanically-actuated numbering device requiring mechanical actuation means (as discussed in reference to FIG. 2) or a mechanically-autonomous electronic numbering device requiring no such mechanical electronic actuation means, as disclosed in European patent application No. 06115994.3 filed on Jun. 23, 2006 in the name of the present Applicant and entitled "NUMBERING DEVICE FOR TYPOGRAPHIC NUMBERING".

The configuration of the supporting disc 1.42 according to this second embodiment is similar to that illustrated in FIGS. 3 to 5 and comprises a peripheral mounting ring 1.43 for mounting of numbering devices, which peripheral mounting ring 1.43 has a T-shaped cross-section defining a pair of annular mounting grooves 1.43*a*, 1.43*b* on each side of the peripheral mounting ring 1.43.

The underside of the numbering device 2.06 is supported on the peripheral mounting ring 1.43 and is secured thereto by means of clamping elements 2.50 (preferably two on each side of the numbering device 2.06 as illustrated, i.e. four in total) adapted to cooperate with the annular mounting grooves 1.43*a*, 1.43*b*. As illustrated in FIG. 9, the underside of the numbering device 2.06, which underside forms a mounting section, preferably has a V-shape with two planar mounting surfaces (not referenced) cooperating with the periphery of the peripheral mounting ring 1.43 such that the numbering device 2.06 contacts the periphery of the peripheral mounting ring 1.43 along two contact lines. In the same way as explained hereinabove in connection with the first embodiment, this permits mounting of the device 2.06 on numbering cylinders of various diameters and is furthermore cheaper to machine during manufacture.

The clamping elements 2.50 are advantageously spring-loaded clamping elements so as to facilitate mounting and adjustment operations. Preferably, as illustrated, the housing 2.60 of the numbering device 2.06 is provided with a pair of mounting leg portions 2.61*a*, 2.62*a* extending on each side of the peripheral mounting ring 1.43, thereby providing a stable support and guidance of the numbering device 2.06 on the peripheral mounting ring 1.43.

The clamping elements 2.50 are mounted on corresponding bearings provided on the mounting leg portions 2.61*a*, 2.62*a* for cooperation with the annular mounting grooves 1.43*a*, 1.43*b*. More precisely, each clamping element 2.50 is mounted so as to be able to pivot about a rotation axis defined by a shaft 2.52 (which shafts are visible on FIGS. 7 and 9).

Preferably, the shaft 2.52 is inserted with some play in the corresponding bearing of the mounting leg portion 2.61*a* or 2.62*a*, and a securing element 2.54 is provided for securing the clamping elements 2.50 onto the shaft 2.52. As illustrated in FIG. 9, the securing element 2.54 can be disposed in a threaded hole provided in the clamping element 2.50, perpendicular to the axis of the shaft 2.52 and communicating therewith. This ensures that the shaft 2.52 and clamping element 2.50 are firmly secured to each other and that the mechanical play in the pivot is limited to the play existing between the shaft 2.52 and the associated bearing provided in the corresponding mounting leg portion 2.61*a* or 2.62*a*. This also facilitates assembly operations of the clamping elements 2.50 onto the numbering device 2.06.

From looking at the Figures, one will appreciate that each clamping element 2.50 is designed in this embodiment as a pivotable clamping lever 2.51 with a hook portion 2.51*a* at the extremity thereof which cooperates with the annular mounting grooves 1.43*a* and 1.43*b*. The distance between the rotation axis defined by the shaft 2.52 and the hook portion 2.51*a* of lever 2.51 is selected to be smaller than the distance between the shaft 2.52 and the uppermost extremity of the lever 2.51. These distances are selected such that the clamping elements 2.50 can be actuated by hand, without any specific tool, while ensuring proper clamping and retaining forces to securely hold the numbering device 2.06 onto the supporting disc 1.42. Each lever 2.51 is thus shaped at its upper extremity in an ergonomic manner so as to be manipulated by hand directly and with ease.

As already mentioned, the clamping elements 2.50 are advantageously spring-loaded clamping elements. In this example, a compression spring 2.53 is disposed between each clamping element 2.50 and a side of the housing 2.60 of the numbering device 2.06, at a location above the pivot defined by shaft 2.52. Blind guiding holes are preferably provided in both the clamping elements 2.50 and the housing 2.60, as illustrated in FIGS. 7 and 9, so as to ensure that each spring element 2.53 remains in its required position to act on the corresponding lever 2.51. According to this embodiment, each compression spring 2.53 generates a force (schematically illustrated in FIG. 10 by the arrow designated by reference $F_2$) which pushes the upper part of each lever 2.51 towards the exterior with respect to the numbering device 2.06, thereby causing the hook portion 2.51*a* to be pushed into the corresponding annular mounting groove 1.43*a*, 1.43*b* with a force illustrated in FIG. 10 by the arrow designated by reference $F_1$. The ratio between forces $F_1$ and $F_2$ will be determined by the corresponding lever arm ratio between the lever distances where forces $F_1$ and $F_2$ apply with respect to the rotation axis of the lever 2.51. In alternate embodiments, other types of spring elements, such as leaf springs or torsion springs, could be used in lieu of compression springs 2.53.

Figure 10:
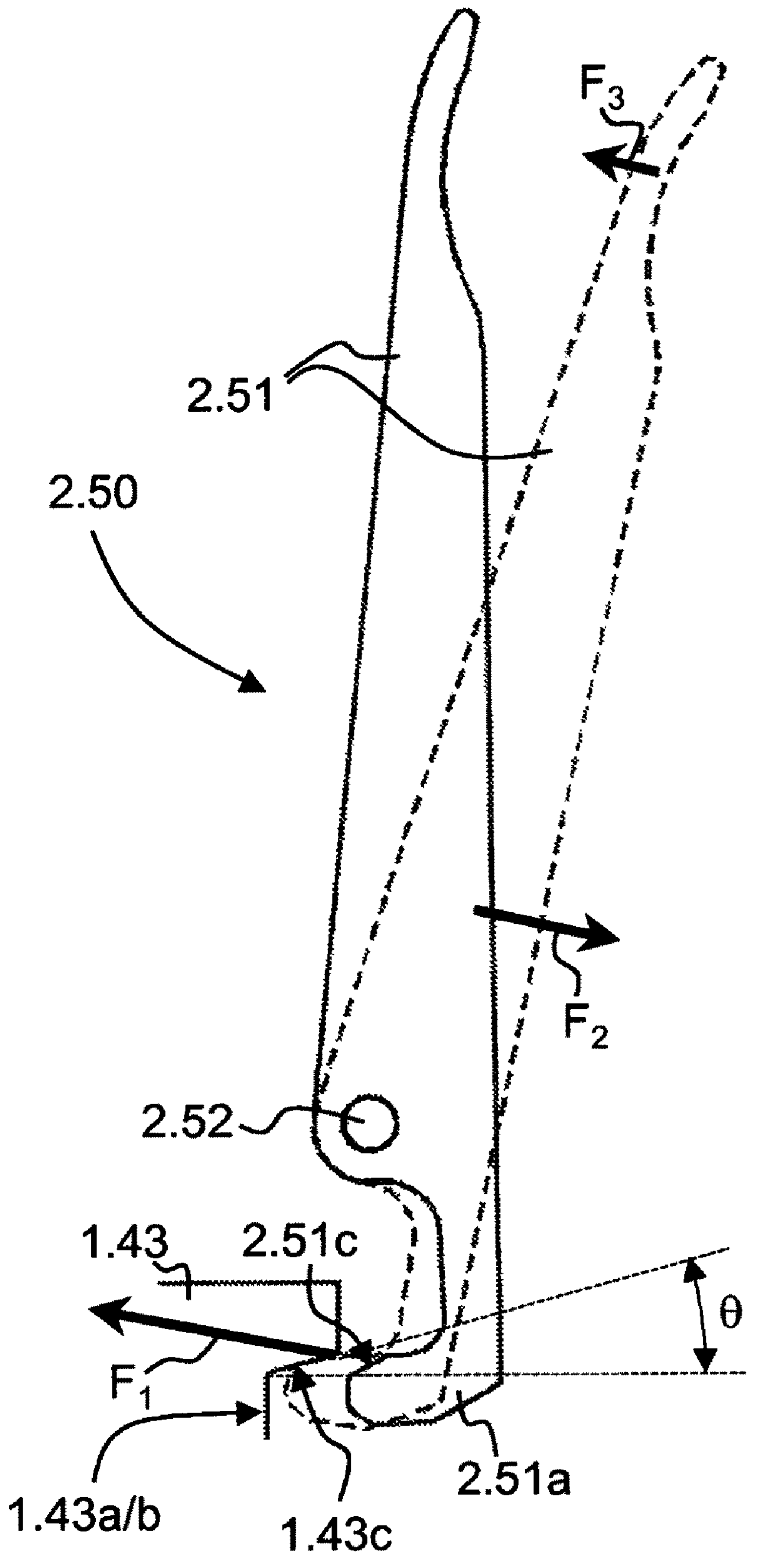
FIGS. 10, 11*a* and 11*b* are schematic side views illustrating the operating principle of the mounting system illustrated in FIGS. 7 to 9.
Figures 11A, 11B:
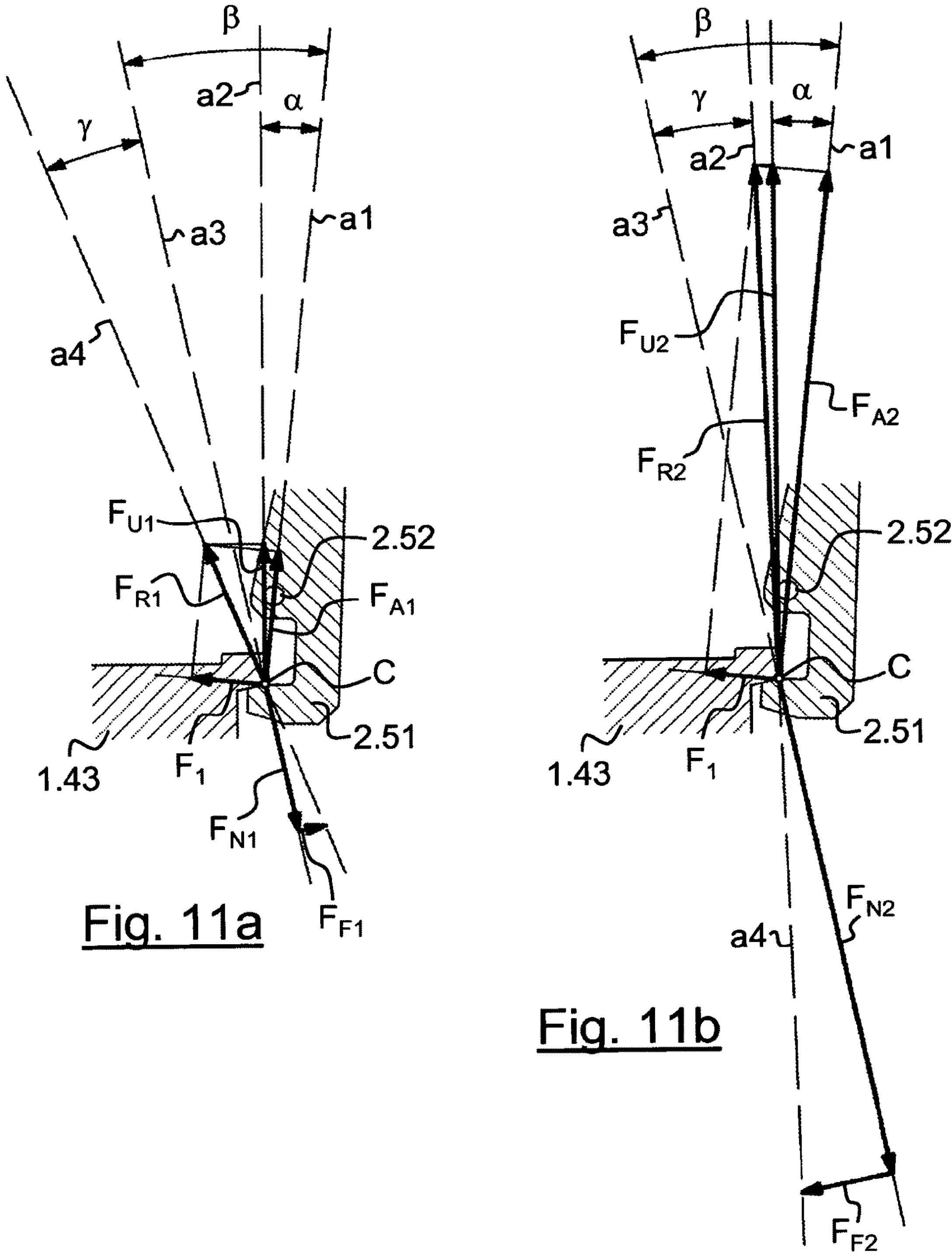

FIGS. 10 and 11*a*, 11*b* schematically illustrates the operating principle of the clamping elements 2.50 of FIGS. 7 to 9. Shown in dashed lines in FIG. 10 is the position of lever 2.51 when in a clamping position, i.e. when it is pushed by the associated compression spring 2.53 (not illustrated in FIG. 10) which generates a force $F_2$ on lever 2.51 as illustrated by the arrow. Shown in continuous lines is the position of lever 2.51 when in a releasing position, i.e. when a force $F_3$ is exerted by hand on the extremity of the lever 2.51 as indicated by the corresponding arrow in FIG. 10.

As this is apparent from FIG. 10, when lever 2.51 is pushed to its releasing position shown in continuous lines, the hook portion 2.51*a* is pulled out of the corresponding mounting groove 1.43*a*, 1.43*b*, creating a sufficient clearance between the head part of the peripheral mounting ring 1.43 and the extremity 2.51*a* of the lever 2.51 to enable dismounting (or mounting) of the numbering device 2.06. When no force is exerted on the upper portion of the lever 2.51, the hook portion 2.51*a* is pushed back into the corresponding annular mounting groove 1.43*a*, 1.43*b*, thereby firmly clamping the numbering device 2.06 onto the peripheral mounting ring 1.43.

The lever configuration illustrated in the Figures is advantageous in that the clamping elements 2.50 can be easily actuated by hand without any specific tool, which greatly facilitates mounting and adjustment operations. The dimensions of the upper portion of each lever 2.51 and the spring force of each spring element 2.53 can be selected such that a force $F_3$ of the order of 14 N is sufficient to actuate each lever 2.51. This is for instance achieved with a spring element 2.53 producing a spring force $F_2$ of the order of 35 N and with a lever arm ratio (equal to $F_3/F_2$) of 0.4. Similarly, the dimensions of the lower portion of each lever 2.51 can be selected such that the resulting force $F_1$, at the extremity of the lever 2.51 contacting the peripheral mounting ring 1.43 is of the order of 55 N. Considering a spring force $F_2$ of the order of 35 N as mentioned above, the corresponding lever arm ratio (equal to $F_1/F_2$) would have to be of the order of approximately 1.6. These numerical examples are of course in no way limiting.

As illustrated in FIGS. 8, 9 and 10, an inner surface 1.43*c* of the head part of the peripheral mounting ring 1.43 of the supporting disc 1.42, which inner surface 1.43*c* cooperates with a corresponding surface 2.51*c* of the hook portion 2.51*a* (see FIGS. 7, 9 and 10), is preferably conical with a positive opening angle θ (theta) with respect to the axis of rotation of the numbering cylinder onto which the supporting disc 1.42 is mounted (as schematically illustrated in FIG. 10). The corresponding surface 2.51*c* on the hook-portion 2.51*a* of the lever 2.51 is similarly conical so as to substantially match the curvature of inner surface 1.43*c*.

When designing the clamping system of FIGS. 7 to 10, it is advantageous to follow the design rules which will now be briefly discussed in reference to FIGS. 11*a* and 11*b*. FIGS. 11*a* and 11*b* are schematic side view of the clamping system respectively in a so-called clamping or rest state (i.e. when no pulling force is applied on the numbering device) and retaining state (i.e. when a pulling force is applied on the numbering device), where reference a1 designates an axis intersecting the axis of shaft 2.52 and the contact point C between the contact surface 2.51*c* of the hook portion 2.51*a* and the inner surface 1.43*c* of the peripheral mounting ring 1.43 (which axis a1 can also be referred to as the "lever axis"), reference a2 designates a vertical line intersecting the contact point C (which vertical is perpendicular to the axis of rotation of the numbering cylinder onto which the numbering device is mounted), reference a3 designates a perpendicular to the inner surface 1.43*c* of the peripheral mounting ring 1.43 intersecting the contact point C, angle α (alpha) is the angle between axes a1 and a2, and angle β (beta) is the angle between axes a1 and a3. It shall be understood that, angle θ (theta) in FIG. 10 correspond to the difference $\beta-\alpha$ of angles α and β.

An additional factor to be considered in the design of the clamping system of FIGS. 7 to 10 is the coefficient of friction cf existing between contact surface 2.51*c* and inner surface 1.43*c*. In the context of static friction, i.e. when there is no relative displacement between two bodies in contact, as in the present case, the coefficient of friction (cf) is equal to the ratio $F_F/F_N$ of the force of friction $F_F$ between the two bodies and the force $F_N$ pressing them together, i.e. the force normal to the contact surface between the bodies. The coefficient of friction cf can thus alternatively be expressed as an "angle of friction" γ (gamma), where $cf=F_F/F_N=\tan(\gamma)$.

In the illustration of FIG. 11*a*, i.e. in the clamping or rest state, the extremity of the lever 2.51 is pushed towards the inner surface 1.43*c* of the peripheral mounting ring 1.43. The resulting force of friction $F_{F1}$, which is proportional to the normal force $F_{N1}$ along axis a3, will thus be directed opposite the direction where the lever 2.51 is pushing as illustrated in FIG. 11*a*. The force $F_{R1}$ produced by the lever 2.51 (i.e. by the combined result of forces $F_1$ and $F_{A1}$, which latter force $F_{A1}$ corresponds to the generated force along the axis a1 of the lever) is directed along a thus defined axis a4 (or "axis of friction") which forms a positive angle γ (i.e. corresponding to the arctangent of cf, namely a tan(cf)) with respect to axis a3.

In the illustration of FIG. 11*b*, i.e. in the retaining state where a pulling force applies on the numbering device, the situation is reversed as far as the force of friction is concerned. In this situation, the force of friction $F_{F2}$ (which is proportional to the normal force $F_{N2}$ along axis a3) is directed in the opposite direction and axis a4, along which the force $F_{R2}$ produced by the lever 2.51 is directed, forms a negative angle γ with respect to axis a3. In the retaining state, the force $F_{R2}$ produced by the lever 2.51 (i.e. by the combined result of forces $F_1$ and $F_{A2}$) thus has a greater component along the vertical axis a2 (as symbolised by arrow $F_{U2}$ in FIG. 11*b*) than in the clamping state (where the relevant component of force $F_{R1}$ along the vertical axis a2 is symbolised by arrow $F_{U1}$ in FIG. 11*a*).

In the clamping state of FIG. 11*a*, forces $F_{R1}$ and its vertical component $F_{U1}$ can be expressed as follows:

$$F_{R1}=F_1/\sin(\beta+\gamma) \quad (1)$$

$$F_{U1}=F_{R1}\cdot\cos(\beta+\gamma-\alpha) \quad (2)$$

In the retaining state of FIG. 11*b*, forces $F_{R2}$ and its vertical component $F_{U2}$ can be expressed as follows:

$$F_{R2}=F_1/\sin(\beta-\gamma) \quad (3)$$

$$F_{U2}=F_{R2}\cdot\cos(\beta-\gamma-\alpha) \quad (4)$$

In the context of the embodiments of FIGS. 7 to 10, 11*a* and 11*b*, as four clamping elements 2.50 are used, the overall force in the clamping state (which can be referred to as the "clamping force") will be four times $F_{U1}$, while the overall force in the retaining state (which can be referred to as the "retaining force") will be four times $F_{U2}$. From looking at FIG. 11*b* and at expression (4) above, it will be understood that the retaining force will be optimum when force $F_{R2}$ is directed along the vertical axis a2, i.e. when the following equation is satisfied:

$$\beta-\gamma-\alpha=0 \quad (5)$$

which expression can also be expressed as a function of angle θ of the inner surface 1.43*c* of the peripheral mounting ring:

$$\theta-\gamma=0 \quad (6)$$

In other words, in the context of the second embodiment of FIGS. 7 to 10, 11*a* and 11*b* it is advantageous and preferable to select angle θ such that it substantially corresponds to the angle of friction γ.

Referring to the above-mentioned numerical example where force $F_1$ generated by each clamping element 2.50 is approximately 55 N, and considering a coefficient of friction of 0.213 (γ=12 degrees) and angles α and β of respectively 6 degrees and 18 degrees (which angles satisfy the optimum expressed in (5) above), this yields an overall clamping force of approximately 400 N and an overall retaining force of approximately 2'100 N, which retaining force is adequate for achieving the required pull resistance preventing the numbering device from getting detached from the supporting disc during operation. These numerical examples are again in no way limiting.

The system according to the present invention can be used in printing machines for documents such as banknotes, securities and other similar printed documents. The system can be mounted in a machine as a step of the entire printing process carried out by said machine, or the system can be used in a stand-alone machine which is only used to number documents. Accordingly, in the present specification, the notion of printing press is intended for a large printing machine which carry several steps of printing or for a stand-alone machine.

It will be understood that various modifications and/or improvements obvious to the person skilled in the art can be made to the embodiments described hereinabove without departing from the scope of the invention defined by the annexed claims.

For instance, while the preferred embodiments of the invention make use of spring-loaded clamping elements, clamping elements without any spring could be used. In that context, one could envisage clamping elements consisting mainly of a cam mechanism with an eccentric cam and releasable clamping members cooperating directly with a base portion of the housing of the numbering device and the annular mounting grooves. The use of spring-loaded clamping elements is however preferred.

In addition, while helical spring elements are illustrated in the drawings, other equivalent types of spring elements could be used, such as leaf springs, torsion springs, or elastomeric springs.

The invention claimed is:

1. A numbering system for carrying out numbering in a printing press with a numbering cylinder comprising a rotatable shaft defining a rotation axis, at least one supporting disc mounted on said rotatable shaft for rotation therewith, said supporting disc comprising a peripheral mounting ring for mounting of at least one numbering device on a periphery of the supporting disc, which numbering device is secured to said peripheral mounting ring by means of a clamping mechanism, wherein said peripheral mounting ring has a T-shaped cross-section defining a pair of annular mounting grooves on each side of said peripheral mounting ring and wherein said numbering device comprises clamping elements on each side of said numbering device which are adapted to cooperate with said annular mounting grooves for securing the numbering device onto said peripheral mounting ring, and wherein said numbering device comprises a V-shaped mounting section with two planar mounting surfaces cooperating with the periphery of said peripheral mounting ring such that said V-shaped mounting section contacts the periphery of the peripheral mounting ring along two contact lines.

2. The numbering system of claim 1, wherein said clamping elements are spring-loaded clamping elements.

3. The numbering system according to claim 2, wherein said spring-loaded clamping elements can be switched between a highly-compressed state where the numbering device is firmly secured to the peripheral mounting ring and a lightly-compressed state where numbering device is held in place on the peripheral mounting ring while still enabling positional adjustment of the numbering device along the circumference of the supporting disc.

4. The numbering system of claim 1, wherein said numbering device comprises a pair of mounting leg portions extending on each side of said peripheral mounting ring, said clamping elements being mounted on said mounting leg portions for cooperation with said annular mounting grooves.

5. The numbering system according to claim 4, wherein each clamping element comprises a clamping leg having a foot engaging into a corresponding one of the annular mounting grooves and a heel engaging against a wall of said mounting leg portions.

6. The numbering system according to claim 1, wherein each clamping element comprises a clamping leg having a foot engaging into a corresponding one of the annular mounting grooves.

7. The numbering system according to claim 1, wherein each numbering device comprises two clamping elements for cooperation with each annular mounting groove.

8. A printing press comprising at least one numbering system according to claim 1.

9. A numbering device for the numbering system according to claim 1, said numbering device comprising clamping elements on each side of the numbering device which are adapted to cooperate with the annular mounting grooves of the T-shaped peripheral mounting ring for securing the numbering device onto the numbering cylinder.

10. The numbering device of claim 9, wherein said clamping elements are spring-loaded clamping elements.

11. A numbering system for carrying out numbering in a printing press with a numbering cylinder comprising a rotatable shaft defining a rotation axis, at least one supporting disc mounted on said rotatable shaft for rotation therewith, said supporting disc comprising a peripheral mounting ring for mounting of at least one numbering device on a periphery of the supporting disc, which numbering device is secured to said peripheral mounting ring by means of a clamping mechanism, wherein said peripheral mounting ring has a T-shaped cross-section defining a pair of annular mounting grooves on each side of said periheral mounting ring and wherein said numbering device comprises clamping elements on each side of said numbering device which are adapted to cooperate with said annular mounting grooves for securing the numbering device onto said peripheral mounting ring, wherein each clamping element comprises a clamping leg having a foot engaging into a corresponding one of the annular mounting grooves, wherein said clamping elements are spring-loaded clamping elements, and wherein each clamping element further comprises a head part secured to said clamping leg at an end thereof opposite said foot and a spring disposed around said clamping leg, which spring is compressed between said head part and a part of the numbering device on which the clamping element is mounted.

12. A numbering system for carrying out numbering in a printing press with a numbering cylinder comprising a rotatable shaft defining a rotation axis, at least one supporting disc mounted on said rotatable shaft for rotation therewith, said supporting disc comprising a peripheral mounting ring for mounting of at least one numbering device on a periphery of the supporting disc, which numbering device is secured to said peripheral mounting ring by means of a clamping mechanism, wherein said peripheral mounting ring has a T-shaped cross-section defining a pair of annular mounting grooves on each side of said peripheral mounting ring and wherein said numbering device comprises clamping elements on each side of said numbering device which are adapted to cooperate with said annular mounting grooves for securing the numbering device onto said peripheral mounting ring, wherein said numbering device comprises a pair of mounting leg portions extending on each side of said peripheral mounting ring, said clamping elements being mounted on said mounting leg portions for cooperation with said annular mounting grooves, wherein each clamping element comprises a clamping leg having a foot engaging into a corresponding one of the annular mounting grooves and a heel engaging against a wall of said mounting leg portions, wherein said clamping elements are spring-loaded clamping elements, and wherein said clamping elements are designed in such a way that the numbering device can be released from the peripheral mounting ring by pressing the clamping elements towards the supporting disc for disengaging the heel from the wall of said mounting leg portions and rotating these elements by 180° so that the clamping legs disengage from the corresponding annular mounting grooves.

13. A numbering system for carrying out numbering in a printing press with a numbering cylinder comprising a rotatable shaft defining a rotation axis, at least one supporting disc mounted on said rotatable shaft for rotation therewith, said supporting disc comprising a peripheral mounting ring for mounting of at least one numbering device on a periphery of the supporting disc, which numbering device is secured to said peripheral mounting ring by means of a clamping mechanism, wherein said peripheral mounting ring has a T-shaped cross-section defining a pair of annular mounting grooves on each side of said peripheral mounting ring and wherein said numbering device comprises clamping elements on each side of said numbering device which are adapted to cooperate with said annular mounting grooves for securing the numbering device onto said peripheral mounting ring, wherein said clamping elements are spring-loaded clamping elements, and wherein said clamping elements are designed in such a way that the numbering device can be moved along said peripheral mounting ring by pressing the clamping elements towards the supporting disc in order to release the pressure exerted by said clamping elements against the annular mounting grooves.

14. A numbering system for carrying out numbering in a printing press with a numbering cylinder comprising a rotatable shaft defining a rotation axis, at least one supporting disc mounted on said rotatable shaft for rotation therewith, said supporting disc comprising a peripheral mounting ring for mounting of at least one numbering device on a periphery of the supporting disc, which numbering device is secured to said peripheral mounting ring by means of a clamping mechanism, wherein said peripheral mounting ring has a T-shaped cross-section defining a pair of annular mounting grooves on each side of said peripheral mounting ring and wherein said numbering device comprises clamping elements on each side of said numbering device which are adapted to cooperate with said annular mounting grooves for securing the numbering device onto said peripheral mounting ring, and wherein each clamping element comprises a pivotable clamping lever having a hook portion engaging into a corresponding one of the annular mounting grooves.

15. The numbering system according to claim 14, wherein said clamping elements are spring-loaded clamping elements and wherein a spring is disposed between a side of said numbering device and said clamping lever in order to push said hook portion of the clamping lever into the corresponding annular mounting groove.

16. The numbering system according to claim 15, wherein each clamping lever is dimensioned such that it can be released by hand by applying a force ($F_3$) on an upper extremity of the lever.

17. The numbering system according to claim 14, wherein an inner surface of said peripheral mounting ring is conical and exhibits a positive angle (θ) with respect to the axis of rotation of said numbering cylinder.

18. The numbering system according to claim 17, where said angle (θ) is selected to correspond substantially to the arctangent (γ) of a coefficient of friction (cf) between the hook portion of the clamping lever and the inner surface of the peripheral mounting ring.

19. The numbering system according to claim 17, wherein a line (a1) intersecting an axis of rotation of said clamping lever and a contact point (C) between the hook portion of the clamping lever and the inner surface of the peripheral mounting ring forms an angle (α) with respect to a vertical line (a2) perpendicular to the axis of rotation of the numbering cylinder.

20. The numbering system according to claim 14, wherein each clamping element is mounted onto a bearing provided on a part of the numbering device by means of a shaft, which shaft is fixedly secured to the clamping lever by means of a securing element.

21. The numbering system according to claim 14, wherein each numbering device comprises two clamping elements for cooperation with each annular mounting groove.

22. The numbering system according to claim 14, wherein said numbering device comprises a V-shaped mounting section with two planar mounting surfaces cooperating with the periphery of said peripheral mounting ring such that said V-shaped mounting section contacts the periphery of the peripheral mounting ring along two contact lines.

23. A printing press comprising at least one numbering system according to claim 14.

24. A numbering device for the numbering system according to claim 14, said numbering device comprising clamping elements on each side of the numbering device which are adapted to cooperate with the annular mounting grooves of the T-shaped peripheral mounting ring for securing the numbering device onto the numbering cylinder.

25. The numbering device of claim 24, wherein said clamping elements are spring-loaded clamping elements.

26. A numbering system for carrying out numbering in a printing press with a numbering cylinder comprising a rotatable shaft defining a rotation axis, at least one supporting disc mounted on said rotatable shaft for rotation therewith, said supporting disc comprising a peripheral mounting ring for mounting of at least one numbering device on a periphery of the supporting disc, which numbering device is secured to said peripheral mounting ring by means of a clamping mechanism, wherein said peripheral mounting ring has a T-shaped cross-section defining a pair of annular mounting grooves on each side of said peripheral mounting ring and wherein said numbering device comprises clamping elements on each side of said numbering device which are adapted to cooperate with said annular mounting grooves for securing the numbering device onto said peripheral mounting ring, wherein said numbering device comprises a pair of mounting leg portions extending on each side of said peripheral mounting ring, said clamping elements being mounted on said mounting leg portions for cooperation with said annular mounting grooves, wherein each clamping element comprises a clamping leg having a foot engaging into a corresponding one of the annular mounting grooves and a heel engaging against a wall of said mounting leg portions, wherein said clamping elements are spring-loaded clamping elements, and wherein each clamping element further comprises a head part secured to said clamping leg at an end thereof opposite said foot and a spring disposed around said clamping leg, which spring is compressed between said head part and a part of the numbering device on which the clamping element is mounted.

* * * * *